3,350,384
DISAZORESORCINOL DYES
Charles L. Conway, Lock Haven, Pa., assignor to American Aniline Products, Inc., a corporation of Delaware
No Drawing. Filed Nov. 3, 1964, Ser. No. 408,657
3 Claims. (Cl. 260—184)

ABSTRACT OF THE DISCLOSURE

Oil soluble disazo dyestuffs useful as gasoline dyes are prepared by coupling two parts of a diazotized mixture of arylamines into resorcinol. The mixture of arylamines comprises from 40 to 70% of mixed xylidine isomers with the remaining portion being mono-alkarylamines, specifically toluidines. No more than 33% of the toluidines in the diazo mixture are p-toluidine.

---

This invention relates to oil-soluble disazo dyestuffs. In one specific aspect it relates to disazo dyes, made using resorcinol as a coupling component, which are remarkably useful for coloring petroleum hydrocarbons; in particular, gasoline.

Disazo derivatives of resorcinol are not new. Orndorff and Ray in the "American Chemical Journal" volume 44 (1910) report disazo derivatives made by coupling two moles of diazotized o- or p-toluidine into resorcinol. The compounds of Orndorff and Ray have never been commercially useful. These compounds lack the proper melting point and solubility characteristics to make them suitable as oil colors.

Approximately a million pounds a year of oil-soluble azo dyestuffs are sold in the United States as colorants for gasoline. The most popular of the gasoline colors is Oil Red (C.I. Solvent Red 24), made by diazotizing aminotoluene and coupling it into beta-naphthol.

The oil colors are marketed either as dry, free flowing powders or granules or as 40–50 percent solutions (by color content) of dye dissolved in a suitable solvent, such as xylene, solvent naphtha or cresylic acid. Two problems are encountered in the marketing of oil-soluble azo dyestuffs as an oil color in powdered form. The dye must have sufficient solubility to avoid the deposition of an insoluble sludge in gasoline and must have a melting point sufficiently high; i.e., 100–135° C., to avoid caking in the final handling steps and in storage. If the dye is to be marketed as a solvent solution, the melting point requirements are somewhat different, inasmuch as products having a melting point below 100° C. provide stable solutions. However, the dye must be sufficiently soluble to avoid any tendency to crystallize out of solution.

I have discovered a new disazo dye composition from diazotized mixed amine isomers and resorcinol. The new composition has both excellent solubility characteristics and the desired melting point range to make it suitable as an oil color either in powdered form or in solvent solution. The use of my new composition in coloring petroleum hydrocarbons is particularly advantageous because the tinctorial strength of the composition is 20–35 percent greater (on equal color content) than that of similar commercially available oil colors.

It is therefore an object of the invention to provide a new disazo dyestuff composition particularly useful as a colorant for petroleum hydrocarbons and capable of being marketed either as a powder or as an oil liquid solution.

In accordance with the invention I have discovered a composition of the formula:

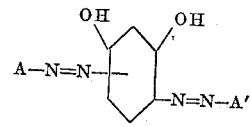

In the above formula A and A′ are members selected from the group consisting of mixed xylyl isomers, and o-alkylphenyl, m-alkylphenyl and p-alkylphenyl, the alkyl groups having from 1 to 4 carbon atoms. At least 40 and not more than 70 percent of the A and A′ members are mixed xylyl isomers and not more than 33 percent of the alkylphenyl groups are p-alkyl.

The mixed xylyl groups of the composition of the invention are necessary to impart solubility to the composition. If the composition contains less than 40 percent mixed xylyl groups, it is not sufficiently soluble in petroleum hydrocarbons. If it contains more than 70 percent xylyl groups, the melting point becomes too low to make its use as an oil color practical in the dry state. The alkylphenyl groups of the composition can be mixed alkylphenyl isomers or pure o-alkylphenyl or p-alkylphenyl isomers. If a mixture of alkylphenyl isomers is used in preparing the composition, not more than 33 percent of the total number of alkylphenyl groups should be p-alkylphenyl. An excess of p-alkylphenyl groups makes the melting point of the composition too high and impairs its solubility.

The composition of the invention is made by the conventional diazotization of a mixture of mixed xylidines and appropriate alkylphenylamine isomers in the above-indicated proportions. The mixture of arylamine reactants is formulated according to the desired proportions and is diazotized in the usual way by adding it to a concentrated solution of strong mineral acid, such as hydrochloric acid, cooling the mixture to a temperature of 0–10° C., and adding thereto a quantity of sodium nitrite slightly in excess of the stoichiometric requirement. An alternate method of diazotization involves dissolving sodium nitrite in concentrated sulfuric acid by heating to a temperature of about 60–70° C., cooling the resulting solution to 0–10° C. and adding it to the mixture of the arylamine isomers.

Two moles of the diazotized mixture of the arylamine isomers are coupled with one mole of resorcinol by adding the diazonium salt solution to a cold aqueous alkaline solution of resorcinol. The mixture is allowed to react for several hours at room temperature and thereafter filtered and washed alkali free. The resulting product is oven dried to give the dyestuff of the invention in the form of a dry powder.

As noted hereabove, the effectiveness of a particular oil color as a colorant for gasoline depends to a large extent on its solubility characteristics. The solubility characteristics of the composition of the invention vary to some extent with the number of mixed xylyl groups that it contains and the particular alkylphenyl isomers present. The preferred composition of the invention has an insoluble content of less than 1.5 percent, as determined by a standard test which comprises placing 2 g. of dye in 200 g. of benzene and shaking for two hours at room temperature. The mixture is filtered, washed with petroleum ether, and dried to determine insoluble content.

The melting point of the composition of the invention will also vary with changes in amounts and types of isomers. The preferred composition, formulated from 50 percent mixed xylidines and 50 percent toluidine, has a melting point of 125–135° C., which is an ideal melting point for marketing the dye in powdered form.

My invention is further illustrated by the following examples:

Example I

To a one-liter beaker equipped with an agitator there was charged: 12 g. mixed xylidines (0.1 mole), 10.7 g. o-toluidine (0.1 mole), 200 g. water, and 60 g. 20° Baumé hydrochloric acid. This solution was iced to 0° C. and 9–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. of resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–30° C., then filtered and washed alkaline free to Brilliant Yellow paper with cold water. The product was oven dried at 80–90° C. to give 34.1 g. of oil color. The product has a melting point of 125–135° C. and an insoluble content of only 1.22 percent, as determined by the standard procedure described above.

Example II

The procedure of Example I was repeated with the exception that m-toluidine was substituted for the o-toluidine. The relative amounts of xylidine and toluidine were held constant. The resulting product had a melting point of 120–130° C. and an insoluble content comparable to that of Example I. Substantially similar results are obtained using 0.12 mole of mixed xylidines and 0.08 mole of mixed toluidines, the mixture of toluidines comprising equal parts of o-, m- and p-toluidine.

Example III

To a one-liter beaker equipped with an agitator there was charged: 6 g. mixed xylidines (0.005 mole), 16.0 g. o-toluidine (0.15 mole), 200 g. water, and 60 g. 20° Baumé hydrochloric acid. This solution was iced to 0° C. and 0–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–30° C. then filtered and washed alkaline free to Brilliant Yellow paper with cold water. The product was oven dried at 80–90° C. to give 34.1 g. of oil color. The product had a melting point of 120–130° C. and an insoluble content of 34.5 percent. It can thus be seen that this product is decidedly inferior to that of Example I from the standpoint of insoluble content.

Example IV

To a one-liter beaker equipped with an agitator there was charged: 24.2 g. mixed xylidine (0.2 mole), 200 g. water, and 60 g. 20° Baumé hydrochloric acid. This solution was iced to 0° C. and 0–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–30° C., then filtered and washed alkaline free to Brilliant Yellow paper with cold water. The product was oven dried at 80–90° C. to give 34.1 g. of oil color. The product had a melting point of 75–80° C. and an insoluble content of less than 1 percent. It can be seen that this product is decidedly inferior to that of Example I from the standpoint of melting point.

Example V

To a one-liter beaker equipped with an agitator there was charged: 24.2 g. p-xylidine (0.2 mole), 200 g. water and 60 g. 20° Baumé hydrochloric acid. This solution was iced to 0° C. and at 0–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–30° C. then filtered and washed alkaline free to Brilliant Yellow paper with cold water. The product was oven dried at 80–90° C. to give 34.1 g. of oil color. The product had a melting point of 211–218° C. and an insoluble content of more than 40 percent. It can be seen that this product is decidedly inferior to that of Example I from the standpoint of both melting point and insoluble content.

Example VI

To a one-liter beaker equipped with agitator there was charged: 24.4 g. o-ethylaniline (0.2 mole), 200 ml. water and 60 g. 20° Baumé hydrochloric acid. This solution was iced to 0° C. and at 0–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–30° C. then filtered and washed alkaline free to Brilliant Yellow paper with cold water. The product was oven dried at 80–90° C. to give 42.2 g. of oil color. This product had a melting point of 148–151° C. and an insoluble content of more than 30 percent. It can be seen that this product is decidedly inferior to that of Example I from the standpoint of both melting point and insoluble content.

Example VII

To a one-liter beaker equipped with agitator were charged: 27.4 g. cresidine (0.2 mole), 200 ml. water and 60 g. 20° Baumé hydrochloric acid. This solution was iced to 0° C. and at 0–5° C. there was added 14.1 g. sodium nitrite as a 20 percent solution. The reaction mixture was held at 0–5° C. for two hours, during which time it was tested for acidity to Congo Red and for the presence of an excess of nitrous acid.

To a two-liter beaker equipped with an agitator there was separately charged: 11 g. resorcinol (0.1 mole), 200 g. water, 8.0 g. sodium hydroxide (100 percent) and 28 g. sodium carbonate. The resulting coupling solution was iced to 0–10° C. and the separately prepared diazonium solution was added thereto. The mixture was stirred overnight at 25–35° C. then filtered and washed alkaline free to Brilliant Yellow paper with cold water. The product was oven dried at 80–90° C. to give 39.0 g. of oil color. This product had a melting point of 221–223° C. and an insoluble content of more than 40 percent. It can be seen that this product is decidedly inferior to that of Example I from the standpoint of both melting point and insoluble content.

I claim:
1. A composition of the formula:

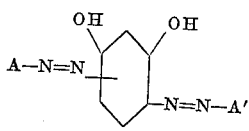

wherein A and A' are members selected from the group consisting of mixed xylyl isomers, o-alkylphenyl, m-alkylphenyl and p-alkylphenyl, wherein the alkyl groups have from 1–4 carbon atoms, at least 40 and not more than 70 percent of said A and A' members being mixed xylyl isomers and not more than 33 percent of said alkylphenyl groups being p-alkylphenyl.

2. A composition of the formula:

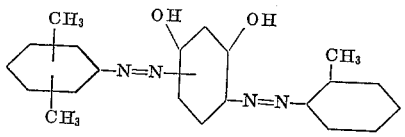

wherein the xylyl radical is a mixture of xylyl isomers.

3. A composition of the formula:

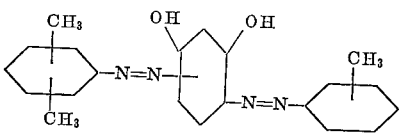

wherein the xylyl radical is a mixture of xylyl radicals and the tolyl radical is a mixture of tolyl radicals, not more than 33 percent of which are p-tolyl.

References Cited

Beilstein, Handbuch Der Organische Chemie, vol. 16, pp. 186–87 (1933).

Chemical Abstracts, 5th Decennial Index, Subject Index, PO–RZ; p. 11035s, 3rd Column (1962).

Kaneniwa, C. A., vol. 50, p. 10036f (1956).

CHARLES B. PARKER, *Primary Examiner.*

FLOYD D. HIGEL, *Examiner.*